(12) United States Patent
Takahashi

(10) Patent No.: US 10,949,015 B2
(45) Date of Patent: Mar. 16, 2021

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 557 days.

(21) Appl. No.: 15/848,148

(22) Filed: Dec. 20, 2017

(65) Prior Publication Data

US 2018/0181253 A1     Jun. 28, 2018

(30) Foreign Application Priority Data

Dec. 26, 2016 (JP) .............................. JP2016-251924

(51) Int. Cl.
*G06F 3/041* (2006.01)
*G06F 3/0488* (2013.01)
(Continued)

(52) U.S. Cl.
CPC ........... *G06F 3/0416* (2013.01); *G03B 13/02* (2013.01); *G06F 3/0488* (2013.01);
(Continued)

(58) Field of Classification Search
CPC .. G06F 3/0416; G06F 3/0488; G06F 3/04847; G03B 13/02; H04N 5/23293; H04N 5/23216
See application file for complete search history.

(56) References Cited

U.S. PATENT DOCUMENTS

2010/0125786 A1* 5/2010 Ozawa ................ G06F 3/04845
                                                                        715/702
2014/0240364 A1* 8/2014 Ishikawa .................. G09G 5/34
                                                                        345/684
(Continued)

FOREIGN PATENT DOCUMENTS

CN         102047318 A      5/2011
CN         102314299 A      1/2012
(Continued)

OTHER PUBLICATIONS

The above foreign patent document was cited in a Nov. 4, 2019 Chinese Office Action, which is enclosed with an English Translation, that issued in Chinese Patent Application No. 201711400949.0.

(Continued)

*Primary Examiner* — Duane N Taylor, Jr.
(74) *Attorney, Agent, or Firm* — Cowan, Liebowitz & Latman, P.C.

(57) ABSTRACT

A display control apparatus comprising: a touch detection unit that detects an touch operation on a display surface of a display unit; an image switching unit that performs a first image switching operation when the touch position is moved in a first direction within a first area, and performs a second image switching operation when the touch position is moved in the first direction within a second area; and a control unit that controls to perform the first image switching operation when the touch position is moved in the first direction after the touch is detected in the second area and, when the touch position is moved to the first area, an angle of a moving direction is greater than a predetermined angle with respect to the first direction, and moving speed is faster than a predetermined speed.

25 Claims, 9 Drawing Sheets

(51) Int. Cl.
*H04N 5/232* (2006.01)
*G06F 3/0484* (2013.01)
*G03B 13/02* (2006.01)

(52) U.S. Cl.
CPC ..... *G06F 3/04847* (2013.01); *H04N 5/23216* (2013.01); *H04N 5/23293* (2013.01); *H04N 5/232933* (2018.08)

(56) References Cited

U.S. PATENT DOCUMENTS

| | | | |
|---|---|---|---|
| 2015/0002424 A1 | 1/2015 | Yamamoto | |
| 2015/0015507 A1 | 1/2015 | Yoshida | |
| 2015/0212667 A1* | 7/2015 | Holt | G06F 3/04842 345/173 |
| 2015/0324074 A1* | 11/2015 | Van Winkle | G06F 3/0482 715/776 |

FOREIGN PATENT DOCUMENTS

| | | |
|---|---|---|
| CN | 104102442 A | 10/2014 |
| JP | 2013-175214 A | 9/2013 |
| JP | 2015-097041 A | 5/2015 |

OTHER PUBLICATIONS

The above reference was cited in a May 7, 2018 European Patent Search Report, which not is enclosed, that issued in European Patent Application No. 17206907.2.

* cited by examiner

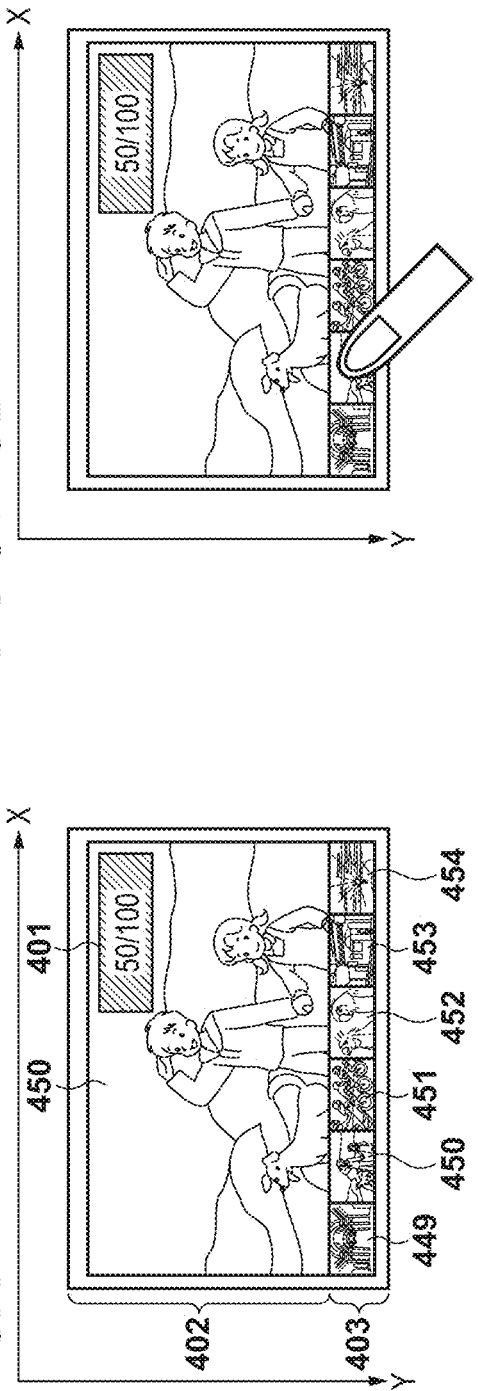
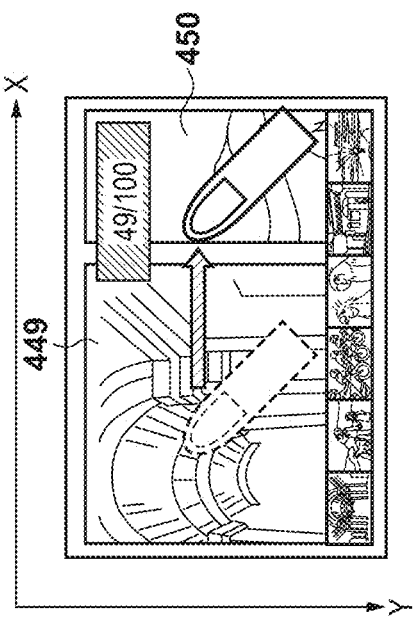
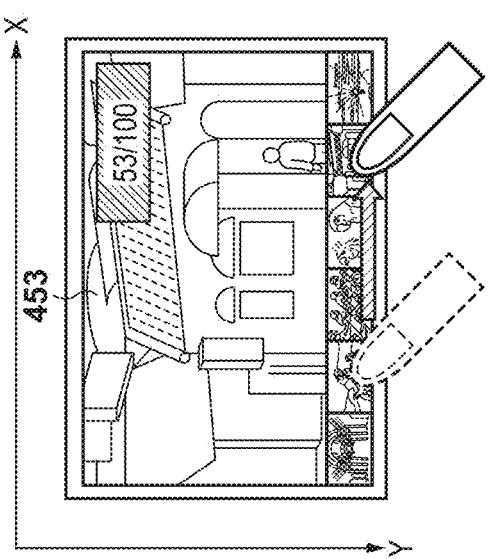

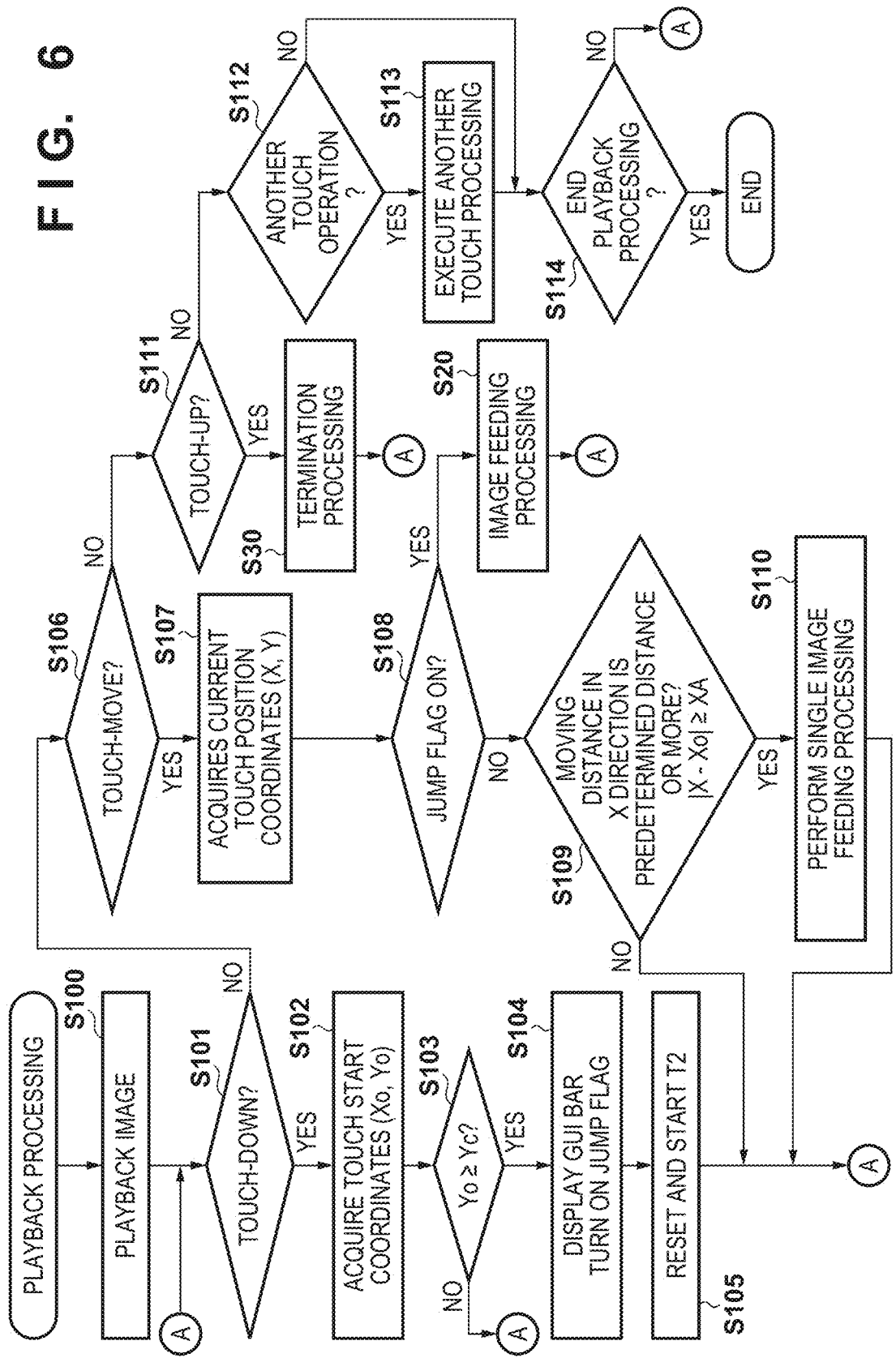

DISPLAY CONTROL APPARATUS, DISPLAY CONTROL METHOD, AND STORAGE MEDIUM

BACKGROUND OF THE INVENTION

Field of the Invention

The present invention relates to a display control apparatus, a display control method, and a storage medium, and more particularly to a display control apparatus and a display control method that perform display control in accordance with touch operation to a display device.

Description of the Related Art

In recent years, electronic devices and smartphones that make a plurality of functions execute depending on the type of touch operation are widely used. Japanese Patent Application Laid-Open No. 2015-97041 discloses that, if a swipe operation is performed, frame advance playback of an image is performed, and if a flick operation with short touch time is performed, fast-forwarding is performed. Also, Japanese Patent. Application Laid-Open No. 2013-175214 discloses changing playback speed of a moving picture according to a start position of touch and changing playback time of the moving picture according to a moving distance with touch.

In many cases, the user searches for a desired image by repeatedly performing operations relating to image reproduction and image forwarding/reversing by touch operation. As described in Japanese Patent Application Laid-Open No. 2015-97041, in a case where a swipe operation and a flick operation are assigned to frame advance playback and fast-forwarding, respectively, when the swipe operation is repeated, the touch operation may gain momentum and a flick operation may be unintentionally performed. If an unintentional touch operation is performed, there is a possibility that an image which is not intended by the user may be displayed because a playback position greatly advances, or an image stored at a distance from an image being searched is reproduced, for example. Further, even if start positions of touch, instead of the types of touch operation, are assigned to playback speeds as disclosed in Japanese Patent Application. Laid-Open No. 2013-175214, while the operation is repeated, there is a possibility that the user may start the touch operation from an unintended position. When the touch operation is started from an unintended position, there is a possibility that a display not intended by the user is made.

SUMMARY OF THE INVENTION

The present invention has been made in consideration of the above situation, and causes an image that is intended by a user to be displayed in a case where an operation for displaying an image by a touch operation.

According to the present invention, provided is a display control apparatus comprising: a touch detection unit capable of detecting an touch operation on a display surface of a display unit; an image switching unit that performs, in a case where a touch position of touch detected by the touch detection unit is moved in a first direction within a first area of the display surface, a first image switching operation which is to switch an image to be displayed on the display unit from a first image to a second image that is listed next to the first image, and performs, in a case where the touch position of touch detected by the touch detection unit is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position and a control unit that controls to perform the first image switching operation in a case where the touch position is moved in the first direction after the touch is detected in the seconds area and, when the touch position is moved to the first area, an angle of a moving direction of the touch position is greater than a predetermined angle with respect to the first direction, and moving speed of the touch position is faster than a predetermined speed.

Further, according to the present invention, provided is a display control apparatus comprising: a touch detection unit capable of detecting an touch operation on a display surface of a display unit; an image switching unit that performs, in a case where a touch position of touch detected by the touch detection unit is moved in a first direction within a first area of the display surface, a first image switching operation which is to switch an image to be displayed on the display unit from a first image to a second image that is listed next to the first image, and performs, in a case where the touch position of touch detected by the touch detection unit is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position; and a control unit that controls not to perform an operation of switching the displayed image to another image with displaying as is the first image in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

Furthermore, according to the present invention, provided is a display control method comprising: detecting an touch operation on a display surface of a display unit by a touch detection unit; performing by a control unit, in a case where a touch position of touch detected in the detection step is moved in a first direction within a first area of the display surface, a first image switching operation which is to switch an image to be displayed on the display unit from a first image to a second image that is listed next to the first image; and performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the control unit controls to perform the first image switching operation in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

Further, according to the present invention, provided is a display control method comprising: detecting an touch operation on a display surface of a display unit by a touch detection unit; performing by a control unit, in a case where a touch position of touch detected in the detection step is moved in a first direction within a first area of the display surface, a first image switching operation which is to switch an image to be displayed on the display unit from a first image to a second image that is listed next to the first image; and performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the control unit controls not to perform an operation of switching the displayed image to another image with displaying as is the first image in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

Further, according to the present invention, provided is a non-transitory computer readable storage medium having stored thereon a program having a program code for realizing a display control method comprising: detecting an touch operation on a display surface of a display unit by a touch detection unit; performing by a control unit, in a case where a touch position of touch detected in the detection step is moved in a first direction within a first area of the display surface, a first image switching operation which is to switch an image to be displayed on the display unit from a first image to a second image that is listed next to the first image; and performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the control unit controls to perform the first image switching operation in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

Further, according to the present invention, provided is a non-transitory computer readable storage medium having stored thereon a program having a program code for realizing a display control method comprising: detecting an touch operation on a display surface of a display unit by a touch detection unit; performing by a control unit, in a case where a touch position of touch detected in the detection step is moved in a first direction within a first area of the display surface, a first image switching operation which is to switch an image to be displayed on the display unit from a first image to a second image that is listed next to the first image; and performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the control unit controls not to perform an operation of switching the displayed image to another image with displaying as is the first image in a case where the touch position is moved is the first direction after the touch is detected in the second area and, when the touch position is moved to the first area, an angle of a moving direction of the touch position is greater than a predetermined angle with respect to the first direction, and moving speed of the touch position is faster than a predetermined speed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A to 3D are diagrams showing examples of images displayed on the display unit and operations for single image feeding processing and jump feeding processing;

FIG. 6 is a flowchart of playback processing according to the embodiment;

DESCRIPTION OF THE EMBODIMENTS

Exemplary embodiments of the present invention will be described in detail in accordance with the accompanying drawings. The dimensions, materials, shapes and relative positions of the constituent parts shown in the embodiments should be changed as convenient depending on various conditions and on the structure of the apparatus adapted to the invention, and the invention is not limited to the embodiments described herein.

Figure 1:
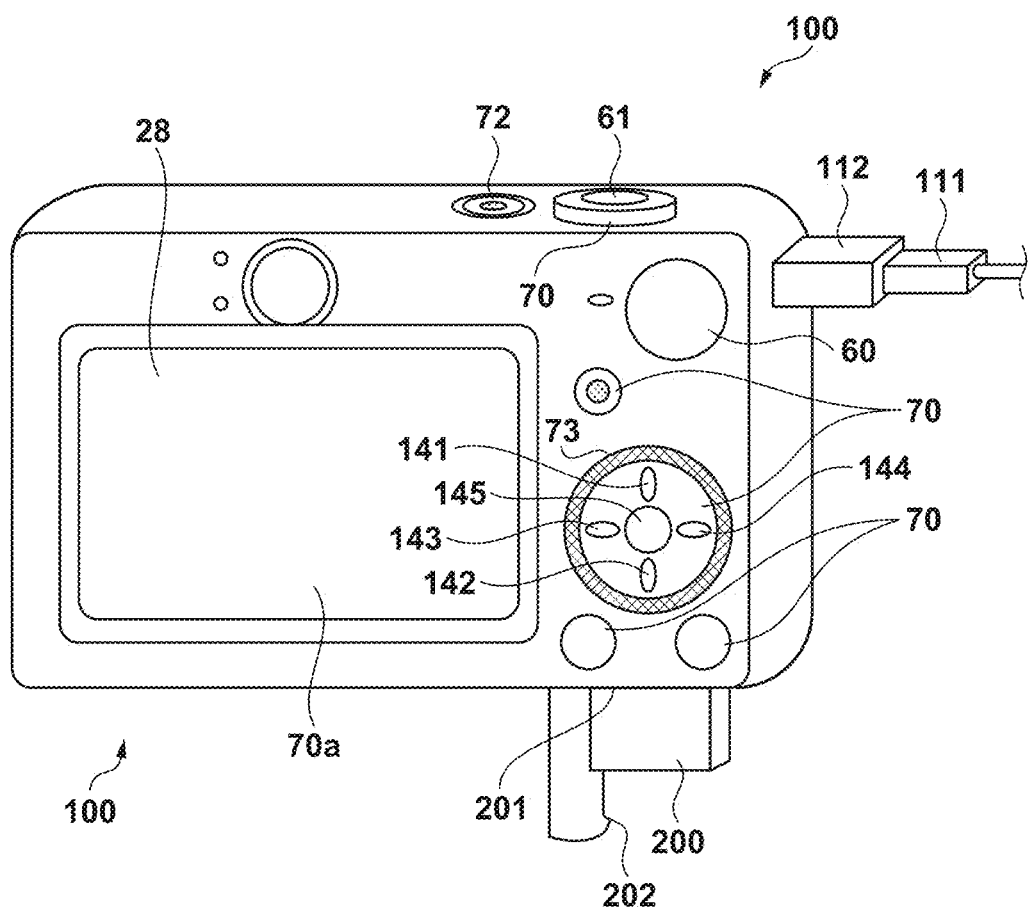
FIG. 1 is a diagram showing an example of an external view of an image capturing apparatus according to a present embodiment.

FIG. 1 shows an external view of a digital camera 100 as an example of an apparatus to which this embodiment can be applied. A display unit 28 displays images and various information. A touch panel 70a can accept a touch operation on the display surface of the display unit 28 and may be provided integrally with the display unit 28 or may be provided so as to overlap with the display unit 28. A shutter button 61 is a button for instructing image sensing, and has a configuration of a two-step switch that gives an instruction to prepare for image sensing by half-pressing the shutter button 61 and gives an instruction to perform image sensing full-pressing the shutter button 61 as will be described later. A mode changeover switch 60 is used for switching between various modes. Operation units 70 include operation members such as various switches, buttons, a touch panel, and so forth, for receiving various operations from the user.

The operation units 70 also include a SET button 145, a controller wheel 73, and cross keys 141 to 144 in addition to the touch panel 70a.

The controller wheel 73 is a rotatable operation member included in the operation units 70 and is used for designating any of selection items together with the cross keys 141 to 144. When the controller wheel 73 is rotated, an electrical pulse signal is generated according to the operation amount, and a system control unit 50 controls each unit of the digital camera 100 based on the pulse signal. From this pulse signal, it is possible to judge a rotation angle of the controller wheel 73, the number of rotations, and the like. It should be noted that the controller wheel 73 may be of any type as long as rotational operation of it can be detected. For example, the controller wheel 73 may be a dial operating member that rotates itself to generate a pulse signal in response to a turning operation by a user. Further, the controller wheel 73 may be an operation member (so-called touch wheel) composed of a touch sensor that detects rotation of the user's finger on the controller wheel 73, and the controller wheel 73 itself does not rotate.

The cross keys 141 to 144 include an up key 141, a down key 142, a left key 143, and a right key 144 indicating each direction. By pressing the SET button 145, it is possible to select a menu item, setting value, and so on, on which a cursor is placed on the display unit 28. A power switch 72 is a push button for switching between power-on and power-off.

A connector 112 is used to connect the digital camera 100 and an external device such as a personal computer or a printer via a connection cable 111. A recording medium 200 includes a memory card, a hard disk, or the like, and is set in a recording medium slot 201. The recording medium 200 set in the recording medium slot 201 can communicate with the digital camera 100 and can perform recording and playback. Normally, the recording medium slot 201 is covered with a lid 202, and in FIG. 1, a state where the lid 202 is opened and a part of the recording medium 200 is exposed when the recording medium 200 is taken out from the recording medium slot 201 is shown.

Figure 2:
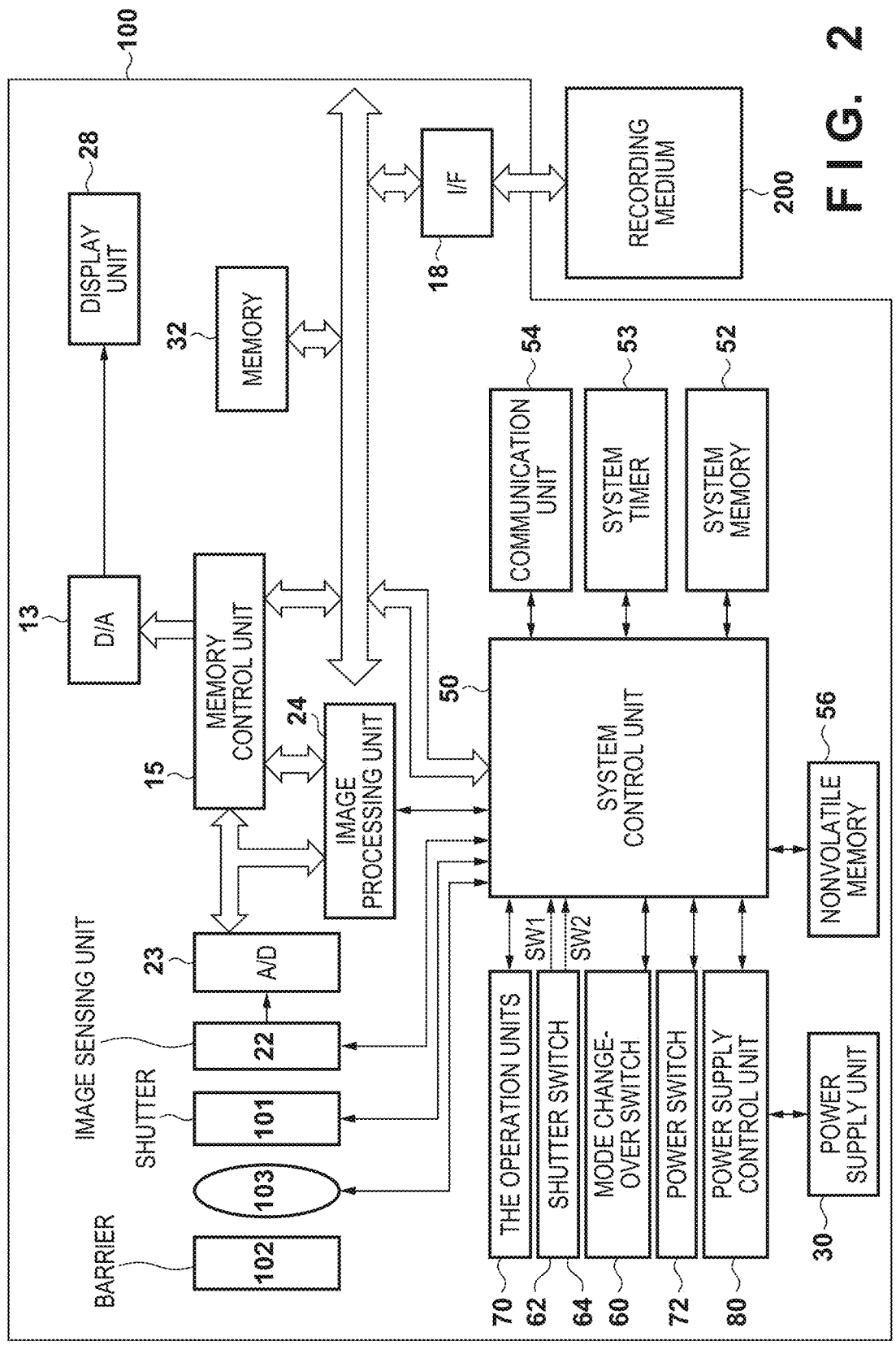
FIG. 2 is a block diagram showing a configuration of an imaging apparatus according to an embodiment.

FIG. 2 is a block diagram showing a configuration example of the digital camera 100 according to this embodiment. In FIG. 2, an imaging lens 103 is represented by a single lens, but it is actually a lens group including a plurality of lenses such as a zoom lens and a focus lens. A shutter 101 has an aperture function. An image sensing unit 22 is an image sensor including a CCD, a CMOS device, or the like, that converts an optical image incident through the imaging lens 103 and the shutter 101 into an electric signal. An A/D converter 23 converts the analog signal output from the image sensing unit 22 into a digital signal. A barrier 102 covers the imaging system including the imaging lens 103, the shutter 101, and the image sensing unit 22 of the digital camera 100, thereby preventing contamination and breakage of the imaging system.

An image processing unit 24 performs prescribed pixel interpolation processing, resizing processing such as reduction, and color conversion processing on data from the A/D converter 23 or data from a memory control unit 15. In addition, the image processing unit 24 performs predetermined arithmetic processing using the image data output from the A/D converter 23, and a system control unit 50 performs exposure control and focus control based on the obtained calculation result. As a result, auto focus (AF) processing, automatic exposure (AE) processing and flash pre-light emission (EF) processing of the TTL (through-the-lens)) method are performed. Furthermore, the image processing unit 24 performs predetermined arithmetic processing using the image data output from the A/D converter 23 and also performs auto white balance (AWB) processing of the TTL, method based on the obtained calculation result.

Output data from the A/D converter 23 is written in a memory 32 via the image processing unit 24 and the memory control unit 15, or via the memory control unit 15. The memory 32 stores image data obtained by the image sensing unit 22 and converted into digital data by the A/D converter 23 and image data to be displayed on the display unit 28. The memory 32 has a sufficient storage capacity to store a predetermined number of still images and a moving image and sound for a predetermined time.

The memory 32 also serves as a memory (video memory) for image display. A D/A converter 13 converts the image display data stored in the memory 32 into an analog signal and supplies it to the display unit 28. In this manner, image data for display written in the memory 32 is displayed on the display unit 28 via the D/A converter 13. The display unit 28 is a display device, such as an LCD, and performs display in accordance with an analog signal from the D/A converter 13. In this manner, the digital signal once A/D converted by the A/D converter 23 and stored in the memory 32 is converted into an analog signal by the D/A converter 13, and successively transferred to the display unit 28 for display. Thus, through image display (live view image display) on the display unit 28 can be performed.

A nonvolatile memory 56 is an electrically erasable/recordable recording medium, for example, an EEPROM or the like is used. In the nonvolatile memory 56, constants, variables, programs and the like for operation of the system control unit 50 are stored. Here, the programs include a computer program for executing processes shown in various flowcharts described later in this embodiment.

The system control unit 50 is a control unit having at least one processor and controls the entire digital camera 100. By executing the programs recorded in the above-mentioned nonvolatile memory 56, each processing of this embodiment to be described later is realized. As a system memory 52, a RAM is used to develop constants and variables for operation of the system control unit 50, programs read from the nonvolatile memory 56, and the like. The system control unit 50 also controls display by controlling the memory 32, the D/A converter 13, the display unit 28, and so forth. A system timer 53 is a time measuring unit that measures the time used for various controls and the time of a built-in clock.

The mode changeover switch 60, a first shutter switch 62, a second shutter switch 64, and the operation units 70 are operation means for inputting various operation instructions to the system control unit 50.

The mode changeover switch 60 switches the operation mode of the system control unit 50 to one of a still image recording mode, a moving image shooting mode, a playback mode, and the like. Examples of modes included in the still image recording mode include an auto shooting mode, an auto scene discrimination mode, a manual mode, an aperture priority mode (Av mode), a shutter speed priority mode (Tv mode), various scene modes that cause different shooting settings for different shooting scenes, a program. AE mode, a custom mode. The mode changeover switch 60 is used to switch directly to one of these modes. Alternatively, after switching once to the shooting mode list screen with the mode changeover switch 60, one of the plurality of displayed modes may be selected and switched using another operating member. Similarly, a plurality of modes may be included in the moving image shooting mode.

The first shutter switch 62 is turned on in the middle of operation, so-called half-pressing, of the shutter button 61 provided in the digital camera 100 (shooting preparation instruction), and generates a first shutter switch signal SW1. The system control unit 50 starts operations such as AF processing, AE processing, AWB processing, EF processing, etc., in response to the first shutter switch signal SW1. The second shutter switch 64 is turned on by the completion of the operation, so-called full-pressing, of the shutter button 61 (photographing instruction), and generates a second shutter switch signal SW2. The system control unit 50 starts a series of shooting operations from the signal reading from the image sensing unit 22 to the writing of the image data in the recording medium 200 in response to the second shutter switch signal SW2.

Each operation member of the operation units 70 is appropriately assigned a function for each scene by selecting one of various function icons displayed on the display unit 28, and functions as various function buttons. Examples of the function buttons include an end button, a return button, an image feed button, a jump button, a narrowing down button, an attribute change button, and the like. For example, when the menu button is pressed, various menu screens that can be set are displayed on the display unit 28. The user can intuitively make various settings using the menu screen displayed on the display unit 28, the cross keys 141 to 144 having buttons for moving to four directions, namely, up, down, left and right directions, and the SET button 145.

A power supply control unit 80 includes a battery detection circuit, a DC-DC converter, a switch circuit for switching blocks to be energized, and the like, and detects the presence or absence of a battery installed, the type of battery, and the remaining battery level. Further, the power supply control unit 80 controls the DC-DC converter based on the detection result and an instruction from the system control unit 50, and supplies necessary voltages to each unit including the recording medium 200 for a necessary period.

A power supply unit 30 includes primary batteries such as alkaline batteries and lithium batteries, secondary batteries such as NiCd batteries, NiMH batteries and Li batteries, AC adapters, and the like. A recording medium. I/F 18 is an interface with a recording medium 200 such as a memory card or a hard disk. The recording medium 200 includes a memory card for recording captured images and is composed of a semiconductor memory, an optical disk, a magnetic disk, and so forth.

A communication unit 54 is connected to an external device by radio or via a wired cable, and performs transmission and reception of video signals, audio signals, and the like. The communication unit 54 can also connect to a wireless LAN (Local Area Network) and the Internet. The communication unit 54 can transmit an image (including a through image) captured by the image sensing unit 22 and an image recorded in the recording medium 200 to an external device, and can receive image data and other various information from an external device.

In the present embodiment, as one of the above-described operation units 70, there is the touch panel 70*a* capable of detecting contact with the display unit 28. As the touch panel 70*a*, any one of various types of touch panels such as a resistance film type, a capacitance type, a surface acoustic wave type, an infrared type, an electromagnetic induction type, an image recognition type, an optical sensor type and the like may be used. There is a method of detecting that there is a touch when there is a contact with the touch panel, and a method of detecting that there is a touch due to the approach of the finger or a pen to the touch panel, and either method may be used.

The touch panel 70*a* and the display unit 28 can be integrally constructed. For example, the touch panel 70*a* may be configured so that its transmittance of light does not interfere with the display of the display unit 28, and is attached to the upper layer of the display surface of the display unit 28. Then, the input coordinates on the touch panel 70*a* is associated with the display coordinates on the display unit 28. As a result, it is possible to configure a GUI (graphical user interface) as if a user can directly operate the screen displayed on the display unit 28. The system control unit 50 can detect the following operation or state of the touch panel 70*a* (touch detectable).

A finger or a pen that did not touch the touch panel 70*a* newly touches the touch panel 70*a*. That is, the start of touch. Hereinafter, it is called "touch-down".

The touch panel 70*a* is in a state of being touched with a finger or a pen. Hereinafter, it is called "touch-on".

A finger or a pen is moving while touching the touch panel 70*a*. Hereinafter, it is called "touch-move".

Having released a finger or a pen that was touching the touch panel 70*a*. That is, the end of touch. Hereinafter referred to as "touch-up".

There is no touch on the touch panel 70*a*. Hereinafter, it is called "touch-off".

When touch-down is detected, touch-on is also detected at the same time. As long as touch-up is not detected after touch-down, normally touch-on is kept detected continuously. Touch-move is detected also in a state in which touch-on is detected. Even if touch-on is detected, touch-move is not detected unless the touch position has moved. After detecting touch-up of all the fingers and pens that have been touching the touch panel 70*a*, touched-off is detected.

These operations/states and the position coordinates of the position where a finger or a pen is touching on the touch panel 70*a* are notified to the system control unit 50 via an internal bus. Based on the notified information, the system control unit 50 determines what operation (touch operation) has been performed on the touch panel 70*a*. With regard to touch-move, it is also possible to judge the movement direction of a finger or a pen moving on the touch panel 70*a* for vertical component/horizontal component independently on the touch panel 70*a* based on the change in position coordinates. When it is detected that the touch-move is performed for the predetermined distance or more, it is determined that a slide operation has been performed. An operation in which a finger or a pen is moved while touching as is the touch panel 70a for a certain distance quickly, then released is called a flick. In other words, flick is an operation to trace quickly so that it flips over the touch panel 70a with fingers. In a case where it is detected that touch-move is performed for a predetermined distance or more at a predetermined speed or more, and touch-up is detected, it can be determined that flick has been performed. That is, it can be determined that flick has occurred following the slide operation.

Further, a touch operation of touching a plurality of points (for example, two points) at the same time and bringing the touch positions to be close to each other is called "pinch-in", and a touch operation of moving the touch positions away from each other is called "pinch-out". Pinch out and pinch-in are generically called a pinch operation.

FIGS. 3A to 3D and FIGS. 4A to 4D are diagrams showing examples of images displayed on the display unit 28 and an operation of single image feeding processing and jump feeding processing. Here, a case where an image stored in the recording medium 200 is displayed on the display unit 28, a function executed when the touch operation is performed on the display unit 28, and touch coordinates and a touch area to be used in the explanation described later will be explained. Further, supplementary explanation will also be given to the problem in the above-described touch operation.

FIG. 3A shows a case where an image 450 is displayed in a main area 402 (first area) of the display unit 28. In the example shown in FIG. 3A, an information display part 401 shows that 100 images are stored in the recording medium 200 and that the image 450 is the 50th image out of 100 images. In addition, a plurality of images (from a thumbnail image 449 to a thumbnail image 454 in this example) before and after the image 450 are displayed in a sub area 403 (second area) located in the lower part of the display unit 28. The number of thumbnail images that can be displayed in the sub area 403 is not limited to six as described above, but may be twenty or thirty, for example.

FIG. 3B shows a state of the display unit 28 in a case where touch-down is performed on the thumbnail image 450 displayed in the sub area 403, and FIG. 3C shows a state of the display unit 28 in a case where touch-move (moving a tough position) is performed from the touch-down state in the plus direction along the X axis (right direction) to an image 453. At this time, the image 453 which is an image after the image 450 in the list of images is displayed on the entire display unit 28. This operation is referred to as jump feeding in this embodiment. After this, touch-up is done to end jump feeding. In other words, it means that jump feeding of three images are performed by one operation of touch-move. How many images will be fed depends on the distance and direction of the touch-move operation.

To display another thumbnail image in the sub area 403 by moving the column of the thumbnail images, touch-move may be performed after long touching the sub area 403. Alternatively, the thumbnail images to be displayed may be switched by operating the left/right key of the cross keys.

Further, FIGS. 3B to 3C, it is described that the thumbnail images do not move even when the touch position is moved and the thumbnail image at the touch position is displayed in the main area 402. However, the thumbnail image in the center of the thumbnail images may be displayed in the main area 402. That is, the thumbnail images are moved in response to the touch-move operation so that a thumbnail image at a specific position such as the center position among the thumbnail images is selected and displayed in the main area 402. At this time, touch-move in the right direction moves the row of the thumbnail images to the right and the thumbnail image on the left side of the thumbnail images is positioned at the center, so an image preceding the displayed image in the list of images is to be displayed next.

Note that an image to be displayed may be displayed not only in the main area 402 but also in the entire display unit 28, and a column of thumbnail images may be displayed so as to be superimposed thereon.

On the other hand, FIG. 3D shows a state in which touch-down is performed in the main area 402 and touch-moved is performed in the plus direction of the X axis from the point of touch-down. In this case, the image is switched from the image 450 displayed on the whole screen to the image 449 which is an image preceding the image 450 in the list of images. In the case of single image feeding, if there is a movement of the touch position for a predetermined distance or more, only one image is advanced irrespective of the distance. That is, if touch-move is performed for a predetermined distance, either an image preceding or following the image being displayed in the list of images will be displayed next depending upon the touch-move direction irrespective of the touch-move distance. If touch is released (touch-up) with the touch-move distance less than the predetermined distance, the image is not switched and the currently displayed image is kept displayed. This operation is referred to as single image feeding in this embodiment. After this, touch-up is done to finish single image feeding. In addition, as shown in FIG. 3D, by displaying a next image according to the touch-move distance at the time of single image feeding, the user can recognize the image switched next.

In FIGS. 3A to 3D, an example of displaying thumbnail images has been described, however a bar which does not include a thumbnail image may be displayed. FIGS. 4A to 4D are diagram for explaining switching of images in a case where a GUI bar (guidance image) in which the longitudinal direction is along the X axis is displayed in response to touching to a predetermined region within a region of the display unit 28 where an image is displayed.

Figure 4A:
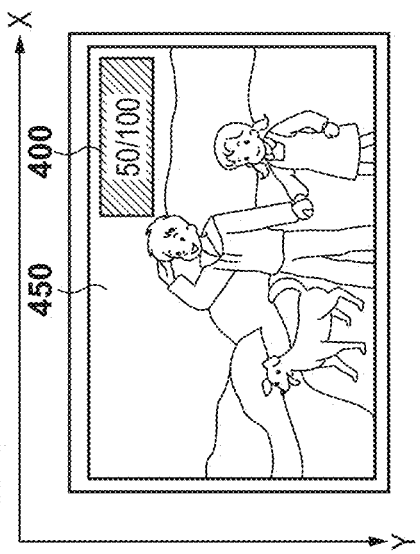
FIGS. 4A to 4D are diagrams showing another example of an image displayed on a display unit and operations for the single image feeding processing and jump feeding processing.
Figure 4B:
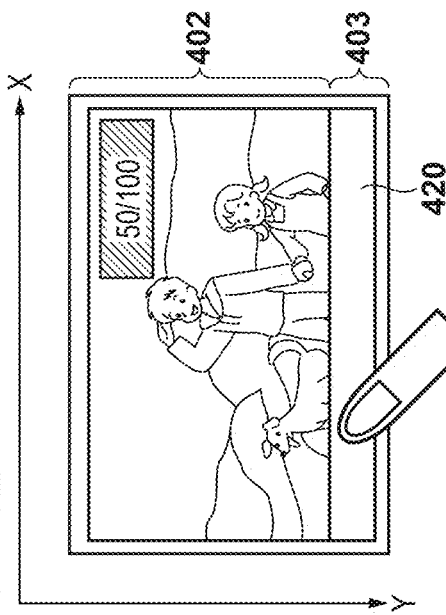
Figure 4C:
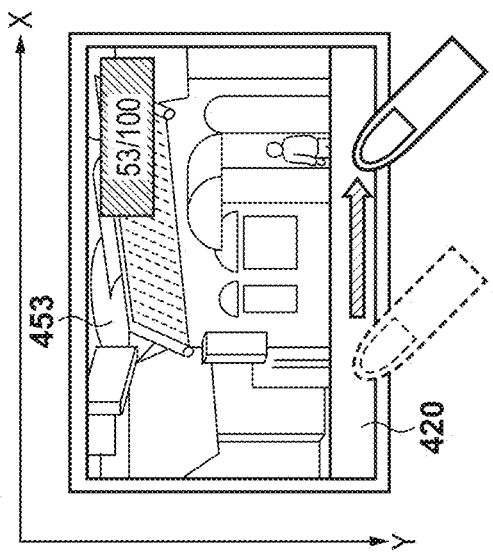
Figure 4D:
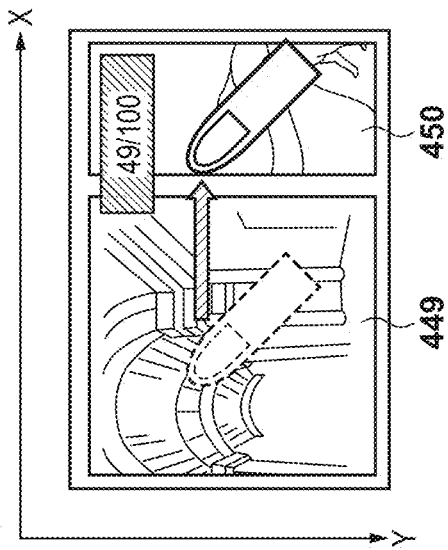

For example, when touch-down is performed on the sub area 403 which is the lower area of the image 450 in the state shown in FIG. 4A, a GUI bar 420 shown in FIG. 45 is displayed is the sub area 403. Further, when touch-move is subsequently performed on the GUI bar 420 in the plus direction of the X axis, a jump feeding is performed in which the image to be displayed next changes in accordance with the movement amount of the touch position. FIG. 4C shows a state in which the touch position has moved by the distance L in the K axis direction. In this case, an image 453 which is distant from the image 450 in the list of images is displayed according to the distance L moved in the X axis direction from the image 450. Then, the bar is hidden in response to touch-up and the jump feeding is ended. Further, when touch-down is performed on an area (main area) other than the lower area of the screen, the GUI bar 420 is not displayed. When touch-move is performed in the main area, single image feeding is performed as shown in FIG. 4D similarly to FIG. 3D.

Figure 5A:
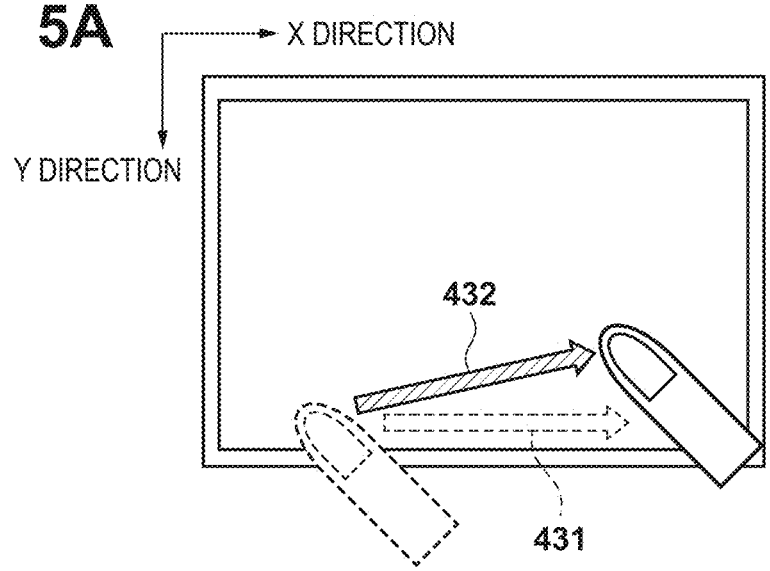
FIGS. 5A to 5C are views showing examples of loci of touch-move operations on the display unit.

FIG. 5A shows a trajectory from touch-down on the display unit 28 to touch-up through touch-move in the right direction. A trajectory 431 shows a trajectory of touch in a case where a user performs touch-move in the plus direction along the X axis on the GUI bar 420 displayed in the sub area 403 in jump feeding described with reference to FIGS. 3A to 3D and FIGS. 4A to 4D. However, when the user holds a right part of the display unit 28 of the digital camera 100 and performs a touch operation with the thumb, even if the user attempt to perform touch-move in the X-axis direction, it is considered that the locus may form a trajectory, such as a trajectory 432. That is, even if the user intends to perform touch-move in the X-axis direction, since the hand cannot be moved largely from the position holding the digital camera 100 and the movable range of the finger is limited, the trajectory may be shifted in a slightly diagonally upper direction (or diagonally lower direction). Further, if the touch panel 70a is compact, there may be a case where the touch-move is performed in the diagonally upward direction from the bottom portion. (or in the diagonally downward direction from the top portion) of the screen in order to secure the movement amount of touch-move. In addition, in the case of repeating single image feeding, if a changed image is not an image that the user intends after the user performs an operation to change images, the user may immediately perform the next image feeding operation. Therefore, there is a possibility that the touch may be started from the sub area 403 without intention while the touch-move operation is repeated many times. In single image feeding, the image to be displayed is forwarded or reversed one by one even if the touch-move distance is long as far as touch-move is performed over a predetermined distance, and so the user may fully perform the touch-move operation. In such a case, if the user unintentionally touches the sub area 403, there is a possibility that an image that is far from the image being displayed in the list of images may be displayed next. It should be noted that any arrangement of areas described above will be allowed as long as the main area 402 is larger than the sub area 403, the selected image is displayed in a large size, and the area used for switching images (the sub area, the area of the thumbnail images, the GUI bar) is large enough to allow touch operation. When displaying thumbnail images, they may be displayed so large that the state of the images indicated by the respective thumbnail images can be grasped.

Figure 5B:
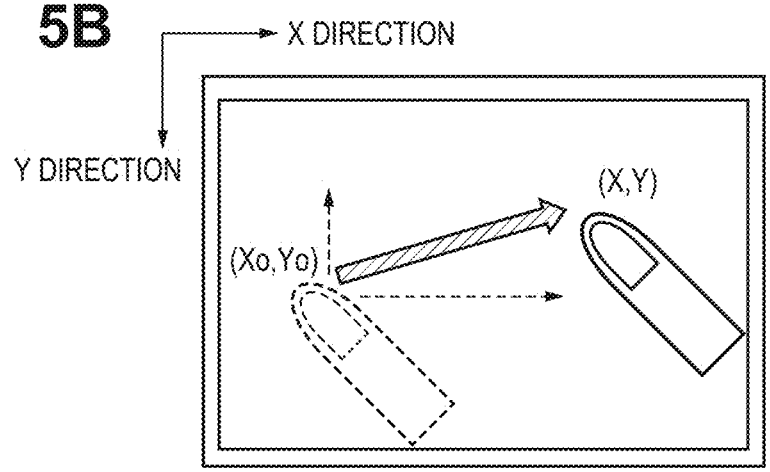
Figure 5C:
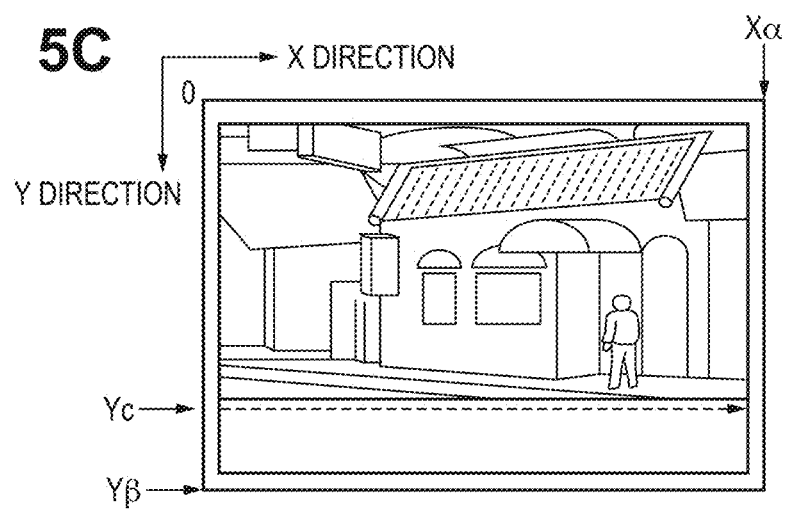

In FIG. 5B, a touch-down point is indicated by (Xo, Yo) and a point where touch-on is currently performed is indicated by (X, Y) in a case where touch-down is performed on the display unit 28 and touch-move is successively performed. Therefore, the amount of movement in the X direction can be indicated as |X-Xo|, and the amount of movement in the Y direction can be indicated as |Y-Yo|. Further, the range (Ys) in the Y axis direction of the sub area 403 shown in FIG. 3B and FIG. 4B is Yc≤Ys<Yβ, and the range (Ym) in the Y axis direction of the main area 402 is 0<Ym<Yc. A row of thumbnail images and the GUI bar 420 are also displayed in the sub area 403.

In the examples shown in FIGS. 3A to 5C, the case where the sub area 403 is arranged at the lower part (lower end) of the screen has been described, however the sub area 403 may be arranged at the upper part of the screen (upper end) or the left or right part (left end, right end) of the screen.

Next, playback processing in the present embodiment will be described with reference to a flowchart in FIG. 6. Each process in the flowchart of FIG. 6 is realized by the system control unit 50 expanding the program stored in the non-volatile memory 56 to the memory 32 and executing it.

When the playback mode is selected, the system control unit 50 controls to read an image from the recording medium 200 in step S100 and display the image on the entire display unit 28 as shown in FIG. 4A, then the process proceeds to step S101. The image displayed at this time may be the latest image or the image displayed in the immediately preceding playback mode. In next step S101, the system control unit 50 determines whether touch-down is detected or not. If touch-down is detected, the process proceeds to step S102, and if touch-down is not detected, the process proceeds to step S106. It is to be noted that, in a case where once Yes is judged in step S101 and it is in the state of touch-on, it is judged as No in step S101, and the process proceeds to step S106.

In step S102, the system control unit 50 acquires the position where touch-down is detected, and stores the acquired position in the system memory 52 as the touch start coordinates (Xo, Yo), then the process proceeds to step S103.

In step S103, the system control unit 50 determines whether or not the Y coordinate Yo of the touch start coordinates is within the range of the sub area. That is, it is determined whether or not Yo≥Yc holds. If it is determined that the Y coordinate Yo of the touch start coordinates is within the sub area range, the process proceeds to step S104, and if not, the process returns to step S101.

In step S104, the system control unit 50 displays the GUI bar in the sub area 403 of the display unit 28 as shown in FIG. 4B, and turns on a jump flag. The jump flag is turned on in a case where the start position of touch is within the sub area 403 shown in FIG. 4B. By doing this, it is possible to indicate to the user that jump feeding can be executed by performing touch-move on the GUI bar.

In the next step S105, the system control unit 50 resets and starts a timer that counts elapsed time T2 since the GUI bar is displayed on the display unit 28. The process then returns to step S101.

On the other hand, in step S106, the system control unit 50 judges whether touch-move is detected or not. If touch-move is detected, the process proceeds to step S107. If touch-move is not detected, the process proceeds to step S111.

In step S107, the system control unit 50 acquires the current touch position coordinates (X, Y) after touch-move is performed and stores it in the system memory 52 as current touch coordinates, and the process goes to step S108.

In step S108, the system control unit 50 determines whether or not the jump flag is ON. That is, the system control unit 50 determines whether the touch start position is within the sub area or within the main region. If the touch is started within the sub area and it is determined that the jump flag is ON, the process proceeds to image feeding processing (step S20), and if not, the process proceeds to step S103. The image feeding processing will be described later with reference to FIG. 7.

In step S109, the system control unit 50 determines whether or not the X component of the current touch position after touch-move is performed has moved by a predetermined distance XA or more from the touch-down position. That is, it is determined whether or not |X-Xo|≥XA holds. If it is determined that the current touch position has moved by the predetermined distance XA or more, the process proceeds to step S110. The predetermined distance XA is, for example, one-third or one-half the size of display unit 28. On the other hand, if it is determined in step S109 that the current touch position has not moved by the predetermined distance XA or more, the process returns to step S101.

In step S110, the system control unit 50 executes the single image feeding processing, and if it is touch-move in the plus direction along the X axis as shown in FIG. 4D, the displayed image is switched to a next image in the list of images. If touch-move is performed in the negative direction along the X-axis, the displayed image is switch to an immediately preceding image in the list of images. In step S110, although the user is still touching the display unit 28, switching of images may be performed after touch-up. That is, when touch-up is determined in step S111 to be described later, if the distance of the movement of the touch position from the start of the touch is the predetermined distance XA or more, the image is switched to one of the preceding and succeeding images, otherwise the image being displayed is kept displayed. Before touch-up is done, part of the image before switching and part of the image after switching may be displayed as shown in FIG. 3D and FIG. 4D so that the proportion of the images displayed changes according to touch-move operation.

On the other hand, in step S111, the system control unit 50 determines whether touch-up is detected or not. If touch-up is detected, termination processing (step S30) is performed. The termination processing will be described later with reference to FIG. 8. If touch-up is not detected, the process proceeds to step S112.

In step S112, the system control unit 50 determines whether or not another touch operation is performed. Note that the other touch operation includes, for example, a pinch operation. If it is determined that the other touch operation is performed, the process advances to step S113 to perform processing according to the other touch operation. For example, in the case of a pinch-out operation, it is conceivable to perform enlargement processing of an image displayed on the display unit 28. After the processing in step S113 or if it is determined at step S112 that another touch operation is performed, the process proceeds to step S114, and the system control unit 50 determines whether or not to end the playback processing. If it is determined that the playback processing is to be ended, the playback processing is terminated, and if it is determined that the playback processing is not to be ended, the process returns to step S101. The playback processing is terminated by turning off the power supply, displaying the menu screen, and photographing instruction.

Figure 7:
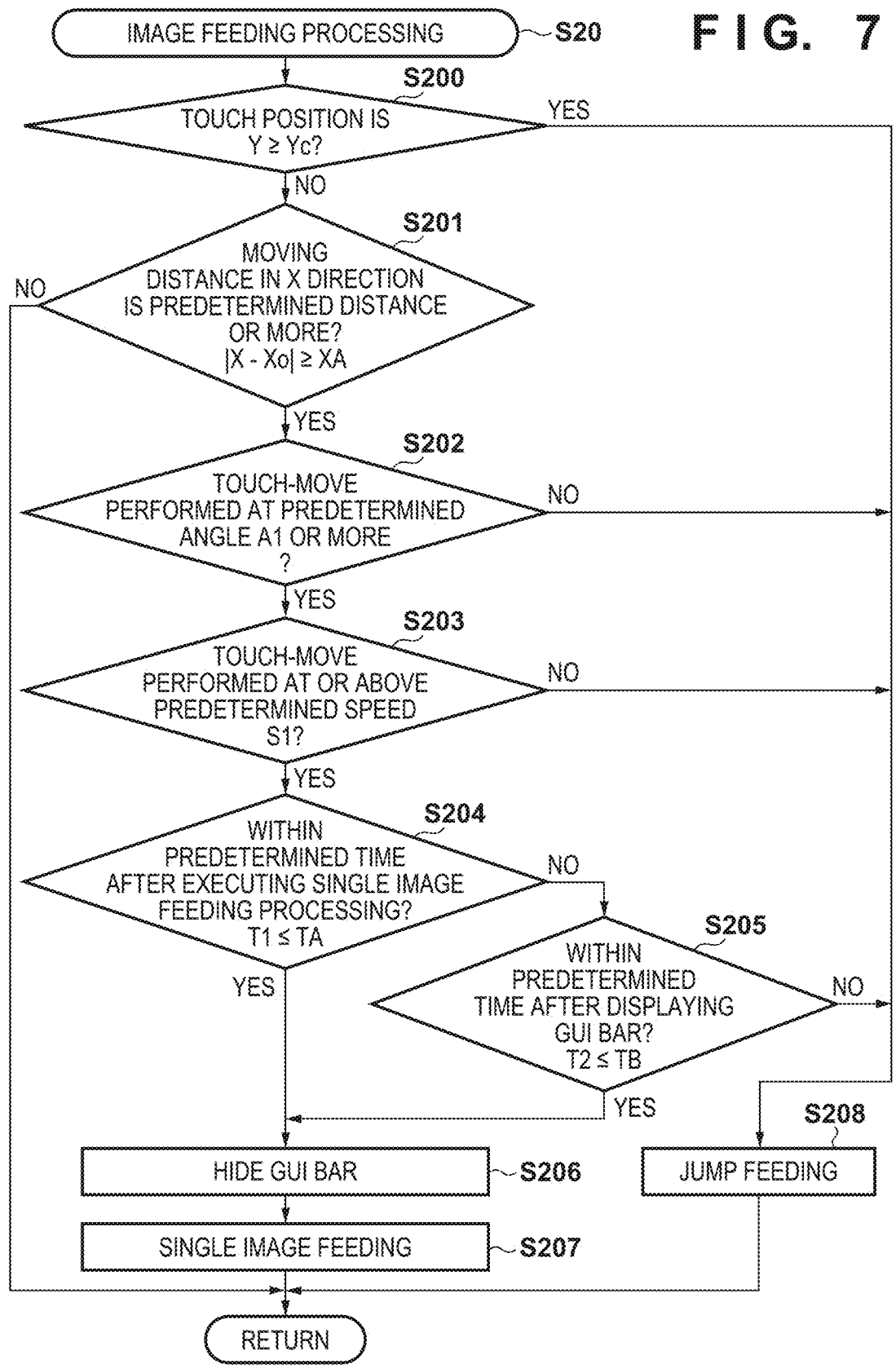
FIG. 7 is a flowchart of image feeding processing according to the embodiment.

Next, the image feeding processing will be described with reference to FIG. 7. The process of FIG. 7 is realized by the system control unit 50 expanding the program stored in the nonvolatile memory 56 to the memory 32 and executing it. FIG. 7 starts when it is determined in step S108 of FIG. 6 that the jump flag is ON.

In step S200, the system control unit 50 determines whether the Y-axis coordinate of the current touch position is within the sub area (within the GUI bar), that is, whether Y≥Yc holds or not. If it is determined that the current Y-axis coordinate of the touch position is within the sub area, the process proceeds to step S208, otherwise proceeds to step S201.

The processes of steps S201 to S205 are processes for judging whether to perform the single image feeding or the jump feeding when the jump flag is ON. Even if the jump flag is ON, the jump feeding may not be performed in some cases, such as a case where touch-move is performed quickly in the diagonal direction, touch-move is done immediately after single image feeding, or touch-move is done immediately after the GUI bar is displayed.

In step S201, the system control unit 50 determines whether or not the X component of the current touch position after touch-move is performed has moved the predetermined distance XA or more from the touch-down position. That is, it is determined whether or not |X-Xo|≥XA holds. If it is determined that the current touch position has moved by the predetermined distance XA or more, the process proceeds to step S202, and if it is determined that the current touch position has not moved by the predetermined distance, the process returns to step S101 in FIG. 6.

In step S202, the system control unit 50 determines whether or not touch-move after touch-down is performed at a predetermined angle A1 or more with respect to the longitudinal direction of the GUI bar. Since the angle of touch-move can be expressed by |tan θ|(=|Y-Yo|/|X-Xo|), here whether |tan θ|(=|Y-Yo|/|X-Xo|)≥A1 holds or not is determined. When the angle of touch-move is equal to or larger than the predetermined angle A1, the process proceeds to step S202, and if it is smaller than the predetermined angle A1, the process proceeds to step S208. The predetermined angle A1 is a value determined on the basis of an angle A2 of touch-move performed at the time of the single image feeding described later, such as a value in a range of plus or minus five degrees from the angle A2. In this way, by judging whether the angle of touch-move at the time of the single image feeding is about the same as (or larger than) the angle of current touch-move, it is known whether the user performs touch-move at the similar angle in the single image feeding. If touch-move is performed at an angle similar to the angle A2, there is a high possibility that the user attempts to perform the single image feeding. The predetermined angle A1 may be a constant angle such as 30 degrees or 45 degrees. If touch-move is performed at the predetermined angle A1 or more with respect to the longitudinal direction of the GUI bar, the process proceeds to step S203, and if not, the process proceeds to step S208.

In step S203, the system control unit 50 determines whether or not touch-move after touch-down is being performed at or above a predetermined speed S1. The speed of touch-move can be expressed by dividing the moving distance since touch-down by the time since touch-down. If the speed is equal to or faster than the predetermined speed S1, the process proceeds to step S204, and if it is slower than the predetermined speed S1, the process proceeds to step S208.

In step S204, the system control unit 50 determines whether or not time T1 since the single image feeding processing was executed has passed a predetermined time TA. If it is within the predetermined time (T1≤TA), the process proceeds to step S206, whereas if it exceeds the predetermined time (T1>TA), the process proceeds to step S205. The predetermined time TA is, inter alia, 1 second or 0.5 second.

In step S205, the system control unit 50 determines whether or not an elapsed time T2 after displaying the GUI bar has passed a predetermined time TB. If it is within the predetermined time (T2≤TB), the process proceeds to step S206, whereas if it exceeds the predetermined time (T2>TB), the process proceeds to step S208. The predetermined time TB is shorter than the tame TA, and is, inter alia, 0.7 seconds or 0.3 seconds. That is, in step S205, it is determined whether touch-move of not less than the distance XA has been performed within a predetermined time after the start of touching the sub area.

In step S206, the system control unit 50 hides the GUI bar displayed on the display unit 28. In other words, by hiding the GUI bar, the user is notified that the jump feeding cannot be executed even if the user performs touch-move in the current condition (i.e., the jump feeding is canceled). Then, in step S207, the system control unit 50 executes the single image feeding processing. Here, the same processing as in the above-described step S110 is performed. After executing the single image feeding processing, the process returns to step S101 in FIG. 6. However, if the process has proceeded to step S207 in a case where the determination as in steps S202 to S205 in FIG. 7 is made when the start position of touch is in the sub area and the jump flag is ON, the single image feeding may not be performed and the displayed image may be kept displayed.

On the other hand, in step S208, the system control unit 50 executes jump feeding processing. In other words, processing for switching the image displayed on the display unit 28 to an image that is several images after the displayed image in the list of images according to the moving distance is executed. For example, as shown in FIG. 3C, a process in which touch-move is performed from the position of touch-down on the image 450 in the X axis direct on and three images are forwarded before touch-up on the image 453 is performed. In order to forward three images with the single image feeding processing, it is necessary to repeat three times the operation of touch-move from a touch-down position and touch-up, so the operation can be simplified by the jump feeding processing. After executing the jump feeding processing, the image feeding processing is terminated and the process returns to step S102 in FIG. 6.

Alternatively, the following operation may be performed during the jump feeding in step S208. Namely, during the touch-move, images are displayed in accordance with the moving distance of a touch position, and at the timing when the touch is released, a displayed image is changed to an image, in the list of images, apart from the displayed image according to a touch-move distance that is from the start of the touch to touch-up. For example, 1 cm of touch-move makes a displayed image advance by 10 images, and 2 cm of touch-move makes the displayed image advance by 20 images, however, if the distance of touch-move is 1.5 cm from the start of the touch when touch-up is finally performed, then the displayed image is changed to an image that is 15 images after the displayed image in the list of images.

It is to be noted that the single image feeding may be performed in a case where one of the conditions of steps S202 to S205 is satisfied or in a case where any combination of the conditions are satisfied. That is, it may be controlled such that if both the judgments of steps S202 and S203 are Yes (i.e., if touch-move is performed quickly in the diagonal direction), the process proceeds to steps S206 and S207, otherwise the process proceeds to step S208. Alternatively, if the determination result in either step S202 or S203 is Yes, the process may proceed to steps S206 and S207.

Further, in addition to the determination in steps S202 and S203, the determination in step S204 or S205 may be made. Furthermore, instead of performing the determination in steps S202 and S203, the single image feeding may be performed in a case where one of the determination in steps S204 and S205 is Yes.

Furthermore, although it has been described that the determination in step S205 is made when it is determined as No in step S204, the determination in step S205 may be performed when it is determined as Yes in step S204. In other words, if touch-move is performed immediately after the preceding single image feeding is performed and immediately after the GUI bar is displayed, there is a high possibility that the user continuously performs the single image feeding operation and does not even notice that the GUI bar is displayed. Therefore, the single image feeding may be performed if it is determined as Yes in steps S204 and S205, and the jump feeding may be performed otherwise.

It has been described that it is determined in step S205 whether or not the elapsed time since displaying the GUI bar is within a predetermined time. However, the following determination regarding the GUI bar may be made. The jump feeding may be performed if it is detected that the touch position has not been moved while touching on the GUT bar for a predetermined time or more, otherwise the single image feeding may be performed. Further, if the user performs touch-down on the GUI bar, stops there for a while without performing touch-move, and then performs touch-move, the jump feeding may be performed irrespective of the touch-move direction and whether or not touch-move is performed a predetermined area. When touch-move is performed after stopping at the touch-down position for a few seconds on the GUI bar, for example, there is a high possibility that touch-move is performed after the user recognizes that the jump feeding processing will be performed. Alternatively, the jump feeding may be also performed in a case where the touched position does not move while touching on the GUI bar after touch-move once performed, then touch-move is performed again.

Figure 8:
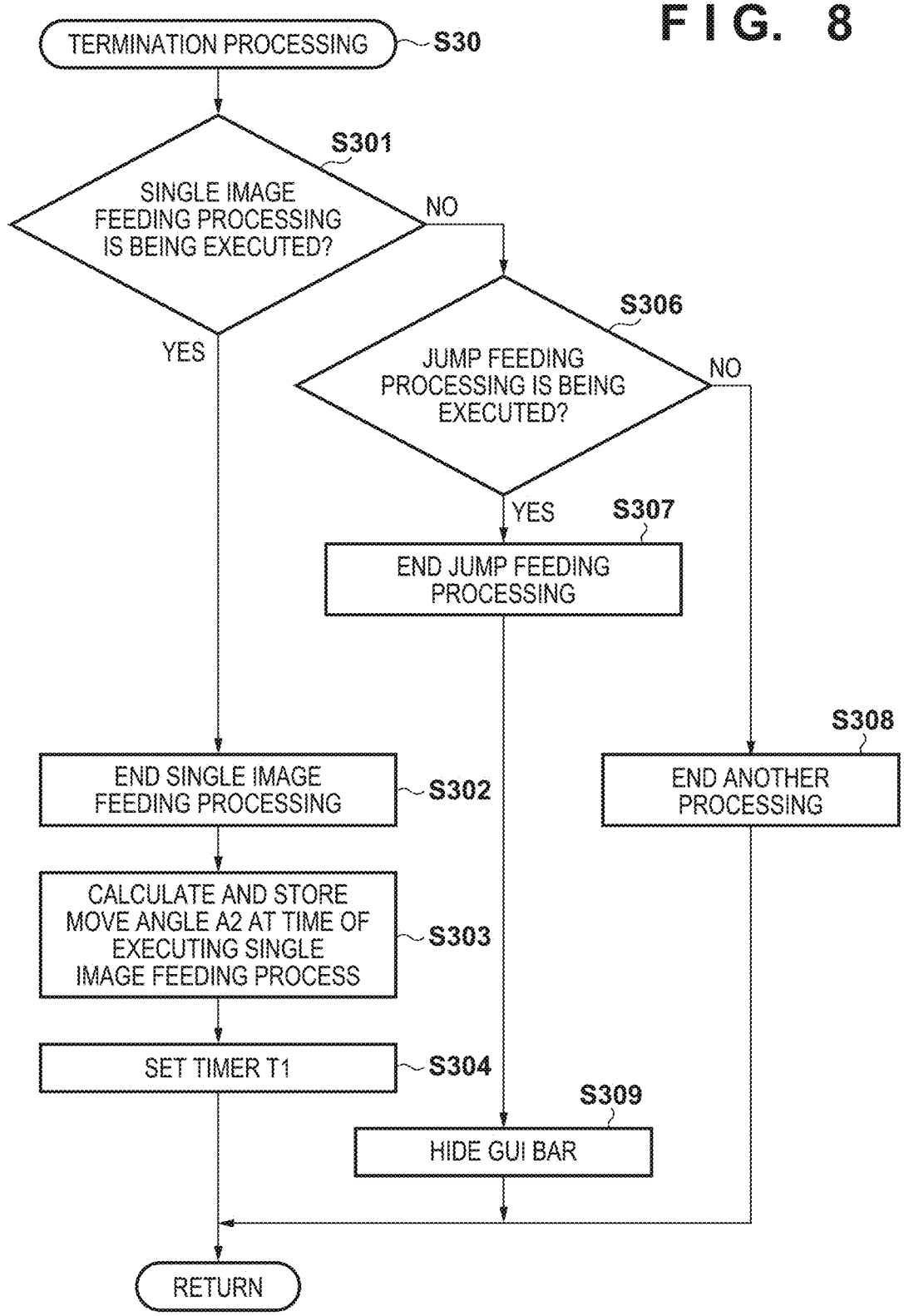
FIG. 8 is a flowchart of termination processing according to the embodiment.

Next, the termination processing will be described with reference to FIG. 8. The processing of FIG. 8 is realized by the system control unit 50 expanding the program stored in the nonvolatile memory 56 to the memory 32 and executing it. FIG. 8 starts when it is determined in step S111 of FIG. 6 that touch-up is detected.

In step S301 of FIG. 8, the system control unit 50 determines whether or not touch-up is detected while the single image feeding processing is being executed. If touch-up is detected while the single image feeding processing is being executed, the process proceeds to step S302, whereas if not, the process proceeds to step S306.

In step S302, the system control unit 50 ends the single image feeding processing. If the touch-move distance in the X-axis direction has not reached the predetermined distance XA, the single image feeding is finished while displaying as is the displayed image without switching images, and if not, the displayed image is changed to an immediately previous or preceding image in the list of images.

In step S303, the system control unit 50 calculates the angle A2 of the locus of touch-move at the time of executing the single image feeding process, stores it in the system memory 52, and the process proceeds to step S304. The angle A2 of touch-move can be obtained from tan θ(=|Y-Yo|/|X-Xo|). In step S304, the timer for counting the elapsed time T1 since the single image feeding processing started is reset and started, and the process returns to step S101 in FIG. 6.

On the other hand, when the process proceeds to step S306, the system control unit 50 determines whether or not touch-up is detected while the jump feeding processing is being executed. If touch-up is detected while the jump feeding processing is being executed, the process proceeds to step S307, whereas if not, the process proceeds to step S308. When the jump feeding processing is completed in step S307, the process goes to step S309 where the GUI bar displayed on the display unit 28 is hidden and the process of FIG. 8 is ended.

In step S308, the system control unit 50 terminates the other processes and ends the process of FIG. 8. For example, if enlargement playback processing of an image displayed on the display unit 28 has been performed in response to a pinch operation performed in step S113 of FIG. 6, the enlargement playback processing is ended. After completion of the other processes, the process returns to step S101 in FIG. 6.

According to the present embodiment as described above, in a case where the jump feeding of changing images in accordance with the touch-move distance and the single image feeding of changing images one by one in order irrespective of the touch-move distance as long as the distance is over a predetermined distance are designated from the same screen, it is possible to realize the image changing operation that more closely follows the user's intention.

If the touch position moves to the outside of the GUI bar by performing touch-move within a predetermined period after displaying the GUI bar, the jump feeding may not be executed. By doing so, it is possible to prevent erroneous operation such as the jump feeding being executed in a case where touch-move is performed erroneously from the lower part of the screen when the user intends to execute the single image feeding. Also, by performing the judgment of steps S203 and S204, the jump feeding is executed if touch-move is performed within the bar display area when the GUI bar is being displayed, so usability is impaired for the user who wants to perform the jump feeding. Accordingly, there is a merit for a user, who wants to perform the jump feeding, that operability is maintained.

Further, in step S202 of FIG. 7, it is determined whether $|\tan \theta(=|Y-Yo|/|X-Xo|) \geq A1$ holds or not. However, it may be configured so that the process proceeds to step S206 in a case where $\tan \theta(=(Y-Yo)/(X-Xo))$ is negative. By doing so, the jump feeding can be performed if the touch position moves in the plus direction along the Y axis even if the locus of touch-move is in the diagonal direction. This makes it possible to prevent erroneous operation only when the touch position moves in the negative direction of the Y axis without deteriorating usability for the user who wants to perform the jump feeding.

Further, in step S202 in FIG. 7, when the GUI bar is displayed along the lower side of the display unit 28, an angle for determining whether to perform the single image feeding processing after touching the GUI bar may be changed depending upon whether touch-move is performed in the upward direction or in the downward direction. That is, even if touch move is performed at the same speed, if touch-move is performed in the upward direction (negative direction of the Y axis), the jump feeding is performed if the angle is within an angle α and the single image feeding is performed if the angle is larger than the angle α, and if touch-move is performed in the downward direction (positive direction of Y axis), an angle larger angle than the angle α is used for judgment. This is because the possibility that the single image feeding processing is performed is high in response to the touch-move operation in the upward direction. Therefore, when touch-move is performed diagonally, it is highly likely that the user intends to designate the single image feeding even if the touch position is on the GUI bar. By contrast, if touch-move is performed in the downward direction, there is a high possibility that the user does not intend to designate the single image feeding. Accordingly, when touch-move is performed in the downward direction, even if touch-move is performed diagonally at an angle larger than an angle of touch-move in the upward direction, the jump feeding processing is performed, which may follow the user's intention. When the GUI bar is displayed along the upper side of the display unit 28, a threshold angle in a case where touch-move in the downward direction is performed may be made smaller than a threshold angle in the case where the touch-move in the upward direction is performed.

As described above, it may be configured such that it is determined whether or not $\tan \theta(=(Y-Yo)/(X-Xo))$ is within a predetermined range in step S202, and if it is within the range, the process proceeds to step 3208, whereas if it is out of the range, the process proceeds to step S203. The range may be set symmetrically or asymmetrically with respect to a predetermined direction.

Figure 9A:
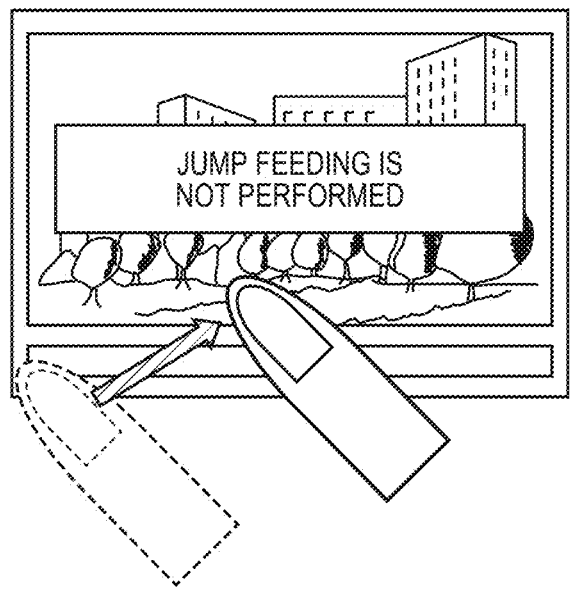
FIGS. 9A and 9B are diagrams showing display examples of messages according to the embodiment.

Further, although it has been explained that the single image feeding processing is described in step S207 of FIG. 7, a message indicating that the jump feeding processing could not be performed may be displayed on the display unit 28 without performing any processing (FIG. 9A). By doing so, it is possible to inform the user the jump feeding cannot be executed despite that touch-down on the bottom of the screen followed by touch-move is performed.

Figure 9B:
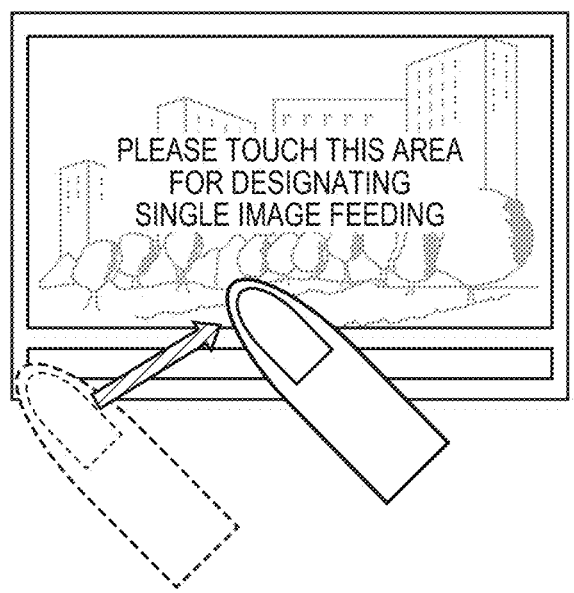

In addition, in step S103 of FIG. 6, it is determined whether or not the Yo coordinate of the touch start coordinates is less than Yc, however, the present invention is not limited thereto. For example, whether or not the Yo coordinate is within the main area of the display unit 28 where the image is displayed is determined, and the margin area where no image is displayed may be dealt with as a sub area. In that case, for example, an message as shown in FIG. 9B may be displayed on the display unit 28. By doing so, there is a merit such that, since the user can easily recognize as area for designating the single image feeding, erroneous operation hardly occurs.

Further, as described above, the GUI bar (operation item) is not limited to be arranged at the lower end of the display unit 28, and it may be arranged at any one of the upper end, the left end, the right end, and the center area. In a case of displaying the GUI bar at the left end or the right end, or in a case of displaying the GUI bar so that the longitudinal direction is in the Y axis direction, the touch-move direction for switching the image is changed to the Y axis direction, not the X axis direction. The GUI bar may be a thumbnail list.

Further, an area where an operation for designating the single image feeding is to be detected is not limited to the main area, and may be an area that is wider than an area where an operation for designating the jump feeding is to be detected.

Furthermore, in the above-described embodiment, control is made so as not to execute the jump feeding processing when the predetermined time TA has not elapsed after the single image feeding processing is executed, however, this control of corresponding to the time may be omitted.

In the above-described embodiment, an image is displayed among a plurality of still images (recorded in the recording medium 200). However, the present embodiment is applicable to a moving image, music, or a slide show. When playing a moving image such as a movie, a television program, and a moving picture recorded by the user, an image of a frame that is to be switched to from an image of a frame currently being played back (being displayed) on the display unit 28 may be changed in accordance with the touch start region. In other words, when touch-move is performed in the main area, an image of the next frame or the next chapter is displayed, and when touch-move is performed in the sub area, an image of a chapter away from the current chapter is displayed in accordance with the touch-move amount. At this time, after the touch is started from the sub area, in a case where the process proceeds to S207 as a result of the judgment explained with reference to FIG. 7, an image of the next frame or the next chapter is displayed. In the case of music, if touch-move is performed in the main area, the next number or a number in the next section is played, and if touch-move is performed in the sub area, a number distant from the played number in the list of music (time) is played depending on the touch-move amount. However, in a case where, after the touch is started from the sub area, the process proceeds to S207 as a result of the judgment explained with reference to FIG. 7, the next number or a number of the next chapter is played.

In the above-described embodiment, the present invention is applied to a digital camera as an example. However, the present invention is not limited to this, and applicable to a display control apparatus capable of displaying an image and capable of touch input. That is, the present invention is applicable to a personal computer, a PDA, a mobile phone terminal, a portable image viewer, a printing apparatus having a display, a digital photo frame, a music player, a game machine, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-251924, filed on Dec. 26, 2016, which is hereby incorporated by reference herein in its entirety.

What is claimed is:

1. A display control apparatus comprising at least one memory and at least one processor which function as:
   a touch detection unit capable of detecting an touch operation on a display surface of a display unit;
   an image switching unit that performs, in a case where a touch position of touch detected by the touch detection unit is moved in a first direction within a first area of the display surface, a first image switching operation which is to switch an image to be displayed on the display unit from a first image to a second image that is listed next to the first image, and performs, in a case where the touch position of touch detected by the touch detection unit is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the first area is an area of the first image and the second area is displayed in the lower part of the display unit with the first image; and
   a control unit that controls to perform the first image switching operation in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

2. The display control apparatus according to claim 1, wherein the control unit controls to perform the first image switching operation in a case where the touch position of the touch detected in the second area is moved in the first direction and, when the touch position is moved to the first area, the angle of the moving direction of the touch position is greater than the predetermined angle with respect to the first direction, the moving speed of the touch position is faster than the predetermined speed, and the touch position is moved within a predetermined first period of time after the first image switching operation is performed.

3. The display control apparatus according to claim 1, wherein the control unit controls to perform the second image switching operation in response to the touch position being moved in a case where the touch position of the touch detected in the second area is not moved within the second area for more than a second period of time.

4. The display control apparatus according to claim 1, wherein the control unit controls to perform the second image switching operation in a case where the touch position is moved in the first direction after the touch is detected in the second area and, when the touch position is moved to the first area, an angle of a moving direction of the touch position less than a predetermined angle with respect to the first direction or moving speed of the touch position is slower than the predetermined speed.

5. The display control apparatus according to claim 1, wherein the predetermined angle is an angle based on a moving direction of the touch position with respect to the first direction when the first image switching operation is performed.

6. The display control apparatus according to claim 1, wherein the predetermined angle differs in a case where the touch position is moved in a positive direction of a second direction that is different from the first direction and in a case where the touch position is moved in a negative direction of the second direction.

7. The display control apparatus according to claim 1, wherein the first direction is an X axis direction of the display unit.

8. The display control apparatus according to claim 1, wherein the control unit controls to perform the first image switching operation in a case where the touch position is moved in the first direction for more than a first distance.

9. The display control apparatus according to claim 1, wherein the control unit controls to perform the first image switching operation in a case where the touch position of the touch detected in the second area is moved in the first direction and, when the touch position is moved to the first area, the angle of the moving direction of the touch position is greater than the predetermined angle with respect to the first direction, the moving speed of the touch position is faster than the predetermined speed, and the touch position is moved within a predetermined third period of time since the touch is detected in the second area.

10. The display control apparatus according to claim 1, wherein, when the first image switching operation is performed, the control unit controls to display the second image on the display unit in response the touch being released in a case where a distance from a start position of the touch on the display surface to a position at which the touch is released is a predetermined distance or more.

11. The display control apparatus according to claim 1, wherein, when the second image switching operation is performed, the control unit switches from the first image to a third image in a case where a moving distance of the touch position in the first direction is a second distance, and switches from the first image to a fourth image which is listed farther from the first image than the third image in a case where the moving distance of the touch position in the first direction is a third distance which is longer then the second distance.

12. The display control apparatus according to claim 1, wherein, when the second image switching operation is performed, the control unit controls to determine an image to be switched to from the first image among a plurality of images in response to the touch being released based on a distance from a start position of the touch on the display surface to a position at which the touch is released.

13. The display control apparatus according to claim 1, wherein the second area is arranged at an upper end, a lower end, a left end, or a right end.

14. The display control apparatus according to claim 1, wherein the first area is larger than the second area.

15. The display control apparatus according to claim 1, wherein the control unit controls to perform a display indicating that the second image switching operation is not performed on the display unit in a case where the first image switching operation is performed in response to a touch operation started at the second area.

16. The display control apparatus according to claim 1, wherein the control unit controls to display an operation item for accepting a touch operation for designating the second image switching operation in the second area in response to the touch is detected in the second area.

17. The display control apparatus according to claim 16, wherein the operation item is a group of thumbnail images or a bar.

18. The display control apparatus according to claim 16, wherein one of the plurality of images is displayed in an area including the first area and the second area of the display unit, and the operation item is displayed in the second area so as to be superimposed on the image.

19. The display control apparatus according to claim 16, wherein one of the plurality of images is displayed in the first area of the display unit, and the operation item is displayed in the second area of the display unit.

20. The display control apparatus according to claim 16, wherein, after the operation item is displayed, the control unit controls to hide the operation item in response to the touch being released.

21. A display control apparatus comprising at least one memory and at least one processor which function as:

a touch detection unit capable of detecting an touch operation on a display surface of a display unit;

an image switching unit that performs, in a case where a touch position of touch detected by the touch detection unit is moved in a first direction within a first area of the display surface, a first image switching operation which is to switch an image to be displayed on the display unit from a first image to a second image that is listed next to the first image, and performs, in a case where the touch position of touch detected by the touch detection unit is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the first area is an area of the first image and the second area is displayed in the lower part of the display unit with the first image; and a control unit that controls not to perform an operation of switching the displayed image to another image with displaying as is the first image in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed.

22. A display control method comprising:

detecting an touch operation on a display surface of a display unit by a touch detection unit;

performing by a control unit, in a case where a touch position of touch detected in the detection step is moved in a first direction within a first area of the display surface, a first image switching operation which is to switch an image to be displayed on the display unit from a first image to a second image that is listed next to the first image; and performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position, wherein the control unit controls to perform the first image switching operation in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed, and wherein the first area is an area of the first image and the second area is displayed in the lower part of the display unit with the first image, and wherein each unit is implemented by one or more processors, circuitry or a combination thereof.

23. A display control method comprising:
- detecting an touch operation on a display surface of a display unit by a touch detection unit;
- performing by a control unit, in a case where a touch position of touch detected in the detection step is moved in a first direction within a first area of the display surface, a first image switching operation which is to switch an image to be displayed on the display unit from a first image to a second image that is listed next to the first image; and
- performing by the control unit, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position,
- wherein the control unit controls not to perform an operation of switching the displayed image to another image with displaying as is the first image in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed, and
- wherein the first area is an area of the first image and the second area is displayed in the lower part of the display unit with the first image, and
- wherein the control unit is implemented by one or more processors, circuitry or a combination thereof.

24. A non-transitory computer readable storage medium having stored thereon a program having a program code for realizing a display control method comprising:
- detecting an touch operation on a display surface of a display unit by a touch detection unit;
- causing a control unit to perform, in a case where a touch position of touch detected in the detection step is moved in a first direction within a first area of the display surface, a first image switching operation which is to switch an image to be displayed on the display unit from a first image to a second image that is listed next to the first image;
- causing the control unit to perform, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position; and
- causing the control unit to perform the first image switching operation in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed,
- wherein the first area is an area of the first image and the second area is displayed in the lower part of the display unit with the first image, and
- wherein the control unit is implemented by one or more processors, circuitry or a combination thereof.

25. A non-transitory computer readable storage medium having stored thereon a program having a program code for realizing a display control method comprising:
- detecting an touch operation on a display surface of a display unit by a touch detection unit;
- causing a control unit to perform, in a case where a touch position of touch detected in the detection step is moved in a first direction within a first area of the display surface, a first image switching operation which is to switch an image to be displayed on the display unit from a first image to a second image that is listed next to the first image;
- causing the control unit to perform, in a case where the touch position of touch detected in the detection step is moved in the first direction within a second area whose longitudinal direction is the first direction and which is different from the first area, a second image switching operation which is capable of switching the image to be displayed on the display unit from the first image to an image listed farther from an image listed next to the first image in response to one moving operation of the touch position and the image to be switched to differs according to the movement of the touch position; and
- causing the control unit not to perform an operation of switching the displayed image to another image with displaying as is the first image in a case where the touch position is moved in the first direction after the touch is detected in the second area and, when the touch position is moved to the first area, an angle of a moving direction of the touch position is greater than a predetermined angle with respect to the first direction, and moving speed of the touch position is faster than a predetermined speed,
- wherein the first area is an area of the first image and the second area is displayed in the lower part of the display unit with the first image, and
- wherein the control unit is implemented by one or more processors, circuitry or a combination thereof.

* * * * *